United States Patent
Eo et al.

(10) Patent No.: US 10,464,548 B2
(45) Date of Patent: Nov. 5, 2019

(54) AUTO CRUISE CONTROL AND SYSTEM FOR HYBRID ELECTRIC VEHICLES

(71) Applicant: Hyundai Motor Company, Seoul (KR)

(72) Inventors: Jeong Soo Eo, Gyeonggi-do (KR); Young Joon Chang, Gyeonggi-do (KR); Ji Won Oh, Gyeonggi-do (KR); Youn Kwang Jung, Gyeonggi-do (KR); Sung Jae Kim, Gyeonggi-do (KR); Ba Ro Hyun, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 359 days.

(21) Appl. No.: 15/385,045

(22) Filed: Dec. 20, 2016

(65) Prior Publication Data

US 2018/0065620 A1    Mar. 8, 2018

(30) Foreign Application Priority Data

Sep. 5, 2016    (KR) .......................... 10-2016-0113819

(51) Int. Cl.
*B60W 20/15*    (2016.01)
*B60K 6/22*    (2007.10)
(Continued)

(52) U.S. Cl.
CPC ............... *B60W 20/15* (2016.01); *B60K 6/22* (2013.01); *B60W 20/40* (2013.01);
(Continued)

(58) Field of Classification Search
None
See application file for complete search history.

(56) References Cited

U.S. PATENT DOCUMENTS

2011/0125294 A1*    5/2011    Yu .......................... B60K 6/48
                                                                    700/33
2013/0103238 A1     4/2013    Yu et al.
(Continued)

FOREIGN PATENT DOCUMENTS

JP    2007-187090 A    7/2007
JP    2007187090 A  *  7/2007
(Continued)

OTHER PUBLICATIONS

Okamura, Yukari; Machine translation of JP-2007187090-A, espacenet.com (Year: 2007).*

*Primary Examiner* — David P. Merlino
(74) *Attorney, Agent, or Firm* — Mintz Levin Cohn Ferris Glovsky and Popeo, P.C.; Peter F. Corless

(57) ABSTRACT

An auto cruise control method and system for hybrid electric vehicles are provided. Particularly, a PnG driving pattern in consideration of characteristics of hybrid electric vehicles is applied to maximize improvement in fuel efficiency and to satisfy both drivability and improvement in fuel efficiency. The auto cruise control method includes turning on an auto cruise control mode by receiving a user set target vehicle speed using an engine and a driving motor as vehicle driving sources, and turning on a pulse and glide (PnG) mode. A user interface (UI) device is provided to receive a selection of any one of a PnG coast mode, a PnG glide mode and a PnG constant-speed cruise mode, and, when the driver selects one mode through the UI device, the hybrid electric vehicle is operated in the selected mode.

12 Claims, 7 Drawing Sheets

(51) Int. Cl.
    *B60W 20/40*     (2016.01)
    *B60W 50/08*     (2012.01)
    *B60W 30/14*     (2006.01)
    *B60W 50/14*     (2012.01)
    *B60W 20/00*     (2016.01)

(52) U.S. Cl.
    CPC ........ *B60W 30/143* (2013.01); *B60W 50/082* (2013.01); *B60W 20/00* (2013.01); *B60W 50/14* (2013.01); *B60W 2050/146* (2013.01); *B60Y 2200/92* (2013.01); *B60Y 2300/146* (2013.01); *B60Y 2300/192* (2013.01); *Y02T 10/52* (2013.01)

(56) References Cited

U.S. PATENT DOCUMENTS

| | | | |
|---|---|---|---|
| 2013/0158838 A1* | 6/2013 | Yorke | B60W 10/06 701/103 |
| 2013/0226420 A1 | 8/2013 | Pedlar et al. | |
| 2014/0195135 A1* | 7/2014 | Miyazaki | F02D 11/105 701/102 |
| 2018/0111618 A1* | 4/2018 | Morimoto | B60W 10/06 |

FOREIGN PATENT DOCUMENTS

| | | |
|---|---|---|
| JP | 2009-190433 A | 8/2009 |
| JP | 2013-086755 A | 5/2013 |
| JP | 5696791 B2 | 4/2015 |
| JP | 2016-130105 A | 7/2016 |

\* cited by examiner

AUTO CRUISE CONTROL AND SYSTEM FOR HYBRID ELECTRIC VEHICLES

CROSS-REFERENCE TO RELATED APPLICATION

This application claims under 35 U.S.C. § 119(a) the benefit of priority to Korean Patent Application No. 10-2016-0113819 filed on Sep. 5, 2016, the entire contents of which are incorporated herein by reference.

BACKGROUND

(a) Technical Field

The present disclosure relates to an auto cruise control method and system for hybrid electric vehicles, and more particularly, to an auto cruise control method and system in which a pulse and glide (PnG) driving pattern in consideration of characteristics of hybrid electric vehicles is applied to maximize improvement in fuel efficiency and to satisfy both drivability and improvement in fuel efficiency.

(b) Background Art

In general, an auto cruise control apparatus of a vehicle executes automatic driving of the vehicle at a predetermined vehicle speed without driver operation of an accelerator pedal and is thus referred to as a constant-speed driving system. When a target vehicle speed is set by a driver operation, the auto cruise control apparatus operates a vehicle to maintain the set target vehicle speed and thus reduces operation of an accelerator pedal by the driver, thus improving driving convenience.

For an internal combustion engine vehicle, such as a gasoline or diesel vehicle, when required torque (cruise torque) to maintain a target vehicle speed is determined, a conventional auto cruise control apparatus executes driving of an engine so that the required torque may be output through cooperative operation between controllers, and executes auto cruise to maintain a target vehicle speed. Further, for an electric vehicle driven using a motor, the conventional auto cruise control apparatus adjusts motor torque according to required torque to maintain a target vehicle speed and, for a hybrid electric vehicle driving using a motor and an engine, the conventional auto cruise control apparatus distributes power to the motor and the engine to output required torque.

When auto cruise is executed in an internal combustion engine vehicle, the operating point of an engine is determined by a vehicle speed and a transmission gear shift position regardless of an engine optimal operating line (hereinafter, referred to as an "OOL"), as exemplarily shown in FIG. 1. Accordingly, auto cruise of the internal combustion engine vehicle is disadvantageous in terms of fuel efficiency, and thus cruise control technology which may improve fuel efficiency is required. Above all, auto cruise control technology for hybrid electric vehicles, which may improve fuel efficiency of a hybrid electric vehicle using an internal combustion engine and a motor as driving sources, is required.

SUMMARY

The present disclosure provides an auto cruise control method in which a pulse and glide (PnG) driving pattern in consideration of characteristics of hybrid electric vehicles is applied to maximize improvement in fuel efficiency. It is another object of the present disclosure to provide an optimal auto cruise control method which may satisfy both drivability and improvement in fuel efficiency.

In one aspect, the present disclosure provides an auto cruise control method for hybrid electric vehicles that may include turning on an auto cruise mode by setting, by a driver, a target vehicle speed in a hybrid electric vehicle using an engine and a driving motor as vehicle driving sources, and turning on a pulse and glide (PnG) mode, providing, by a user interface (UI) device, a UI to select any one of a PnG coast mode, a PnG glide mode and a PnG constant-speed cruise mode, when the driver selects one mode through the UI device, driving the hybrid electric vehicle in the selected mode.

In particular, in the PnG coast mode, a pulse phase that corresponds to a vehicle acceleration section and a coast phase that corresponds to a vehicle deceleration section may be alternately repeated between set upper and lower limit target vehicle speeds, and coasting of the hybrid electric vehicle by inertia of the hybrid electric vehicle may be executed in the coast phase. In the PnG glide mode, the pulse phase that corresponds to a vehicle acceleration section and a glide phase that corresponds to a vehicle deceleration section may be alternately repeated between the set upper and lower limit target vehicle speeds, and deceleration driving of the hybrid electric vehicle based on a speed profile, set by inertia of the hybrid electric vehicle and torque assistance of a driving motor, may be executed in the glide phase. In addition, in the PnG constant-speed cruise mode, the hybrid electric vehicle may maintain the target vehicle speed using the vehicle driving sources.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

Figures 1, 2:
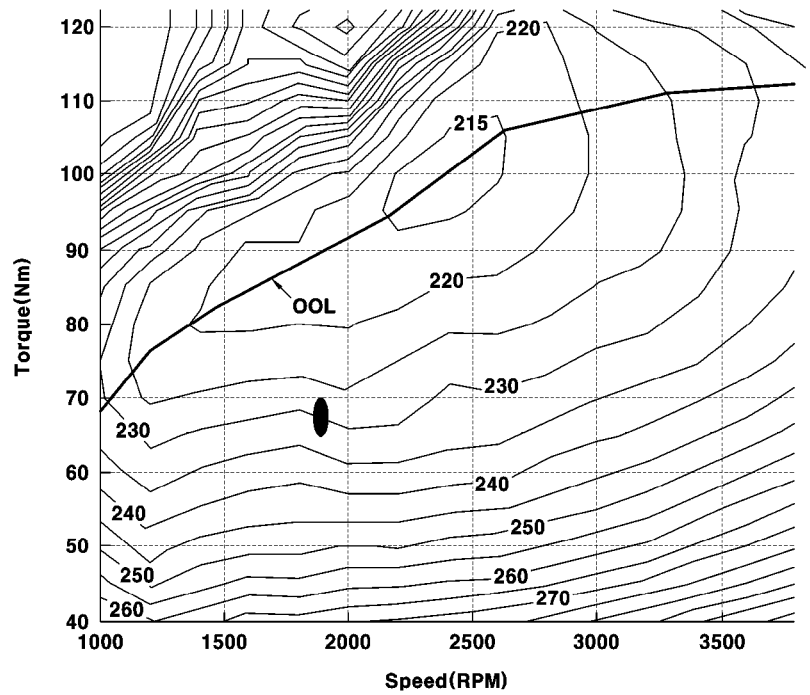
FIG. 1 is a graph illustrating the operating point of an engine during auto cruise of an internal combustion engine vehicle according to the related art.
FIG. 2 is a graph illustrating a general PnG cruise state according to the related art.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other exemplary embodiments within the spirit and scope of the disclosure as defined by the appended claims.

In order to solve the reduction of fuel efficiency caused by a conventional auto cruise control method for internal combustion engine vehicles, various auto cruise control methods are proposed. For example, utility of a pulse and glide (hereinafter, referred to as "PnG") driving pattern, in which acceleration and deceleration of a vehicle are repeated in a particular cycle to improve fuel efficiency while cruising under real-world driving conditions is proved in many directions.

FIG. 2 is a graph exemplarily illustrating a known PnG cruise state for internal combustion engine vehicles according to the related art. In particular, PnG driving refers to a driving pattern in which an average target vehicle speed is maintained, a vehicle speed is increased in a pulse phase to adjust the operating point of an engine to be about the optimal operating line (OOL) and thus the vehicle is driven at a point having high engine efficiency, and coasting of the vehicle is executed in a glide phase so that total fuel consumption may be reduced as compared to conventional constant-speed driving.

With reference to FIG. 2, in the pulse phase, the vehicle accelerates to a greater speed than a cruise speed set by a driver and, in the glide phase, the vehicle decelerates by coasting in which the vehicle is driven in the fuel cut state of the engine. The vehicle is driven such that the pulse phase and the glide phase are periodically alternately repeated. However, in application of the conventional PnG cruise control, there is a tradeoff between a variation of the vehicle speed (related to drivability) and a fuel efficiency amount and, thus, optimal control technology which may satisfy both drivability and improvement in fuel efficiency is required.

According to various technologies in the related art, an operating point having high efficiency on an engine brake specific fuel consumption (BSFC) map is tracked. For example, one conventional art discloses a control apparatus and method which implement a PnG function in a general internal combustion engine vehicle and, more particularly, technology in which control to track upper and lower limit target vehicle speeds set based on a reference vehicle speed is executed during adjustment of a vehicle speed and the target vehicle speeds are tracked through an increase and a decrease in a fuel amount of a combustion chamber. Further, another conventional art discloses an apparatus and method which improve fuel efficiency by minimizing vehicle speed fluctuation and minutely adjusting a throttle value through PnG control and, more particularly, technology in which a pulse in a rapid cycle is applied to a throttle value without vehicle speed fluctuation and an engine operating point moves to an operating point having high efficiency on a BSFC map to improve fuel efficiency.

The present disclosure relates to an apparatus and method which implement a PnG function in a hybrid electric vehicle (HEV) using an internal combustion engine and a motor as driving sources, and the object of the present disclosure is to maximize fuel efficiency improvement effects using a PnG driving pattern in consideration of characteristics of the hybrid electric vehicle.

In general, a hybrid electric vehicle may be operated at an optimal operating point, i.e., on an optimal operating line (OOL), by a hybrid power optimization strategy between an engine and a motor, and such a driving strategy causes reduced efficiency due to charging/discharging in an electrically powered system. Therefore, when an engine operating point located on the OOL is determined simultaneously with minimization of use of the electrically powered system, fuel efficiency may be improved.

Based on the above aspect, in the present disclosure, during auto cruise driving of a hybrid electric vehicle, vehicle acceleration (e.g., a pulse phase; OOL-oriented driving) and vehicle deceleration (e.g., a coast phase or a glide phase; execution of fuel cut or powered deceleration) may be alternately repeated periodically while maintaining an average target speed, thereby improving fuel efficiency under real-world driving conditions.

During the above-described PnG driving in which vehicle acceleration and deceleration are alternately repeated periodically, control to track upper and lower limit target vehicle speeds through variation of required torque may be executed, and control to distribute torque to an engine and a motor to output power providing required torque necessary to adjust a vehicle speed during vehicle acceleration (in the pulse phase) may be executed. Further, during vehicle deceleration, coast driving (e.g. the coast phase) may executed or glide driving (e.g., the glide phase) may be executed.

The present disclosure may be applied to a transmission mounted electric device (TMED)-type hybrid electric vehicle in which a driving motor to drive the vehicle is disposed at a transmission. In a general TMED-type hybrid electric vehicle, two driving sources configured to operate the vehicle, i.e., an engine and a driving motor, may be disposed in series, an engine clutch may be disposed between the engine and the driving motor, and a transmission may be disposed at the output side of the driving motor.

The engine clutch connects the engine and the motor to each other to selectively transmit power therebetween, or to disconnect the engine and the motor from each other to prevent power transmission therebetween. In a closed state of the engine clutch, the engine and the motor are connected so that power may be transmitted to driving shafts and driving wheels through the transmission. In other words, the engine clutch is disposed to selectively transmit power or prevent power transmission between the engine and the driving motor and, as is well known, during driving of the vehicle in the electric vehicle (EV) mode, the engine clutch is opened and thus the vehicle may be driven by power of the driving motor and, during driving of the vehicle in the hybrid electric vehicle (HEV) mode, the engine clutch is closed and thus the vehicle may be driven by power of the engine and power of the driving motor.

Further, during braking of the vehicle or during inertial driving of the vehicle, an energy regeneration mode, in which the driving motor is operated as a power generator to charge a battery, may be executed. A separate motor generator directly connected to the engine to transmit power to the engine, i.e., a hybrid starter generator (HSG), is provided, and the HSG may be operated using power of the battery and thus may be configured to transmit power to the engine during starting of the engine and may be operated as a power generator by rotary force transmitted from the engine and thus charges the battery during power generation.

In a general hybrid electric vehicle, various controllers configured to operate respective devices in the vehicle are provided. In other words, a hybrid control unit (HCU), an engine control unit (ECU) configured to operate an engine, a motor control unit (MCU) configured to control operate a driving motor, a transmission control unit (TCU) configured to operate a transmission and an engine clutch, a battery management system (BMS) configured to operate and manage a battery, etc. are provided, and operation of the respective devices may be executed through cooperative control between the controllers under the control of the HCU operating as a highest-level (e.g., an upper) controller. For example, the TCU may be configured to adjust clutch operating hydraulic pressure according to a control command of the HCU, and thus close or open the engine clutch.

In the present disclosure, such cooperative control between the controllers may be executed during vehicle speed adjustment in the respective modes during auto cruise driving, and operations of the engine, the driving motor, the transmission and the engine clutch may be executed by the corresponding controllers. Although the above description states a plurality of controllers configured to operate respective devices in the vehicle, an integrated controller may be used instead of the separate control units and in the specification, both the control units and the integrated controller will be commonly called control units or controllers.

Figure 3:
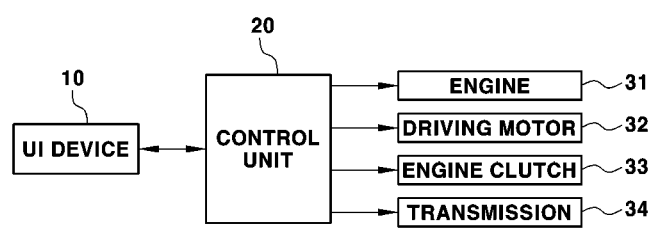
FIG. 3 is a block diagram illustrating the configuration of an auto cruise control system in accordance with an exemplary embodiment of the present disclosure.

FIG. 3 is a block diagram illustrating the configuration of an auto cruise control system in accordance with the present disclosure. First, an auto cruise mode in the present disclosure may include a PnG mode executed by turning on the PnG mode when a driver sets a target vehicle speed and turns on the auto cruise mode, and the PnG mode may include a plurality of driving modes. In other words, the PnG mode in the present disclosure may include a plurality of driving modes, such as, a PnG constant-speed cruise mode (PnG_const), a PnG coast mode (PnG_coast) and a PnG glide mode (PnG_glide).

Particularly, the PnG coast mode (PnG_coast) may be divided into a first PnG coast mode (PnG_coast_ideal) that corresponds to an ideal driving mode, in which vehicle dynamic characteristics and a transient state are not reflected and considered, and a second PnG coast mode (PnG_coast_real) that corresponds to a real driving mode, in which the vehicle dynamic characteristics and the transient state are reflected and considered. For example, the PnG mode may be defined as including four modes, i.e., the PnG constant-speed cruise mode (PnG_const), the first PnG coast mode (PnG_coast_ideal), the second PnG coast mode (PnG_coast_real), and the PnG glide mode (PnG_glide).

Since the first PnG coast mode (PnG_coast_ideal) is an ideal driving mode in which the vehicle dynamic characteristics and the transient state are not reflected and considered, the first PnG coast mode (PnG_coast_ideal) is not actually applied as the PnG mode in the present disclosure. Hereinafter, the PnG coast mode (PnG_coast) indicates the second PnG coast mode (PnG_coast_real).

In summary, the PnG mode in the present disclosure may include three driving modes, i.e., the PnG constant-speed cruise mode (PnG_const), in which the vehicle is driven while constantly maintaining a target vehicle speed set by a driver, the PnG coast mode (PnG_coast), in which vehicle acceleration (the pulse phase) and deceleration (the coast phase) are alternately repeated periodically and, in the coast phase, the transmission is in the neutral position, the engine clutch is opened and coasting of the vehicle in the fuel cut or engine complete stop state of the engine (coasting of the vehicle by inertia of the vehicle) is executed, and the PnG glide mode (PnG_glide), in which vehicle acceleration (the pulse phase) and deceleration (the glide phase) are alternately repeated periodically and, in the glide phase, deceleration of the vehicle execute along a speed profile set by inertia of the vehicle and power of the driving motor.

Figure 4:
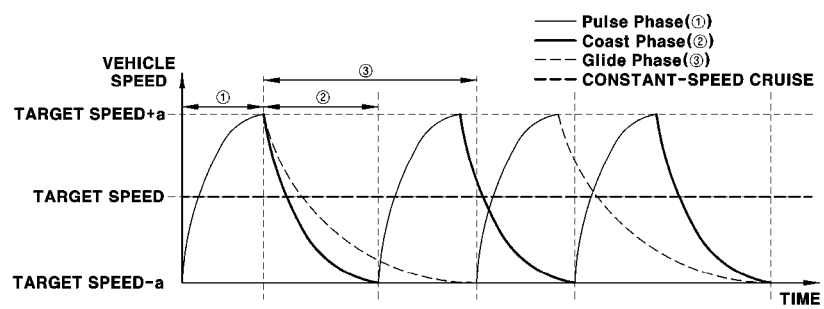
FIG. 4 is a graph illustrating cruise states in respective modes of a PnG mode of a hybrid electric vehicle in accordance with an exemplary embodiment of the present disclosure.

FIG. 4 is a graph exemplarily illustrating cruise states in the respective modes resulting from subdivision of the PnG mode of the hybrid electric vehicle in accordance with the present disclosure, and Table 1 below represents transmission gear positions, states of the engine clutch and whether engine fuel cut occurs in the respective PnG modes.

The PnG coast mode (PnG_coast) and the PnG glide mode (PnG_glide) may be set to have a driving pattern in which vehicle acceleration and deceleration are alternately repeated periodically, and the PnG coast mode (PnG_coast) and the PnG glide mode (PnG_glide) have no difference in a control of an acceleration section (the pulse phase) but differ with respect to the control of a deceleration section. In particular, in the deceleration section (the coast phase) of the PnG coast mode (PnG_coast), the vehicle driving sources may be configured to generate no power and the vehicle decelerates by inertia.

Further, in the deceleration section (the glide phase) of the PnG glide mode (PnG_glide), torque assistance of the driving motor may be executed to increase a driving distance during deceleration even when a minimal amount of energy in the vehicle is consumed, differently from the deceleration section (the coast phase) of the PnG coast mode (PnG_coast). Particularly, during deceleration in the PnG glide mode (PnG_glide), power of the driving motor may be transmitted to driving shafts and driving wheels through the transmission to decelerate the vehicle at a gradual deceleration gradient (i.e., at a lower deceleration rate), as compared to during deceleration in the PnG coast mode (PnG_coast). For example, during deceleration in the PnG glide mode (PnG_glide), the motor may assist generation of required torque requested by the driver to adjust a vehicle speed in deceleration and thus a driving distance may be extended, differently from deceleration in the PnG coast mode (PnG_coast) in which the vehicle is driven by inertia.

Motor torque assistance, in which the motor generates and outputs driving force that corresponds to a torque assistance amount by the motor and the vehicle decelerates by force acquired by adding the driving force of the motor (i.e., torque assistance force) to inertial force of the vehicle, may be performed and, therefore, the vehicle may gradually decelerate by the torque assistance force by the motor applied in the deceleration state, compared to during deceleration of the vehicle in the PnG coast mode (PnG_coast).

Therefore, deceleration of the vehicle in the PnG glide mode (PnG_glide) causes consumption of energy in the vehicle, compared with deceleration of the vehicle in the PnG coast mode (PnG_coast), but has advantages including an increased driving distance and improved drivability. Consequently, in terms of drivability, the PnG constant-speed cruise mode (PnG_const), in which the vehicle maintains a constant vehicle speed, has the highest drivability, and the PnG glide mode (PnG_glide), in which the vehicle decelerates at a relatively gradual rate in the deceleration section, has higher drivability than the PnG coast mode (PnG_coast), in which the vehicle rapidly decelerates in the deceleration section.

Further, in terms of vehicle energy consumption, the PnG constant-speed cruise mode (PnG_const), in which energy of the vehicle is continuously consumed in all sections to maintain a constant vehicle speed, is most disadvantageous, and the PnG glide mode (PnG_glide), in which energy of the vehicle is consumed in the deceleration section, is more disadvantageous than the PnG coast mode (PnG_coast), in which no energy of the vehicle is consumed in the deceleration section. Therefore, the PnG coast mode (PnG_coast) has the highest fuel efficiency, followed by the PnG glide mode (PnG_glide) and the PnG constant-speed cruise mode (PnG_const).

Hereinafter, in the present disclosure, the deceleration section of the PnG coast mode (PnG_coast) will be defined as the "coast phase", and the deceleration section of the PnG glide mode (PnG_glide) will be defined as the "glide phase" (with reference to FIG. 4). In Table 1 below, states of the engine clutch and whether fuel cut of the engine is performed in the PnG coast mode (PnG_coast) and the PnG glide mode (PnG_glide) are related to the deceleration sections (the coast phase and the glide phase).

TABLE 1

| Division | Transmission gear | | Engine clutch | Fuel cut | Required torque |
|---|---|---|---|---|---|
| | Pulse phase | Coast/Glide phase | | | |
| PnG_coast | In Gear | Neutral | Open | o | Pulse phase: o Coast phase: x |
| PnG_glide | In Gear | In Gear | Open | o | o (motor) |
| PnG_const | HEV In Gear | In Gear | Close | x | o (engine + motor) |
| | EV In Gear | In Gear | Open | o | o (motor) |

In the present disclosure, auto cruise may be executed in any one of the above three modes, i.e., the PnG constant-speed cruise mode (PnG_const), the PnG glide mode (PnG_glide) and the PnG coast mode (PnG_coast), by the driver's mode selection, and a controller 20 may be configured to execute predetermined control of respective devices in the vehicle in each mode. In other words, the controller 20 may be configured to operate an engine 31, a driving motor 32, an engine clutch 33, a transmission 34, etc. to execute any one of the above-described modes of the PnG mode, selected by the driver, for example, to adjust fuel supply to the engine 31 (i.e., fuel cut, etc.), open or close the engine clutch 33, adjust the transmission 34 to be in the neutral position, etc.

Further, selection of one of the modes resulting from subdivision of the PnG mode by the driver may be performed under the condition that the driver turns on both the auto cruise mode and the PnG mode, as described above. Particularly, the auto cruise mode may be turned on by setting a target vehicle speed by operating a user interface (UI) device 10 in the vehicle, such as a button or a switch, by the driver (cruise "set"). Accordingly, upon engagement of the UI device to select the operation of auto cruise control, the controller 20 may be configured to receive a signal from the UI device 10 based on the driver manipulation and thus may be configured to recognize that the auto cruise function is turned on by the driver.

Additionally, the PnG mode may also be turned on by operating a user interface (UI) 10 in the vehicle, such as a button or a switch, by the driver (PnG "on"). The operation of the PnG mode may be selected by the driver, and the controller 20 may be configured to receive a signal from the UI device 10 based on the driver manipulation and thus may be configured to recognize that the PnG function is turned on by the driver. In the vehicle, the UI device 10 or operation to turn on/off the auto cruise function may be distinguished from the UI device 10 or operation to turn on/off the PnG function.

In the present disclosure, any one of various modes resulting from subdivision of the PnG mode may be selected based on driver intention and, for this purpose, the UI device 10 connected to the controller 20 may be used. In other words, the PnG mode may be divided into a plurality of modes, and a mode selection function, in which the driver may select any one of a plurality of modes resulting from subdivision of the PnG mode, is provided.

To implement such a mode selection function, the UI device 10 connected to the controller 20 may be used, and the UI device 10 for driver mode selection may include display units of a cluster or other display devices installed within the vehicle, and an input unit which may be operated by the driver. In particular, the display units of the cluster or the display devices may be configured to display information allowing the driver to select a mode and to input setup information, and the input unit may be an operating device, such as a button or a switch, operated by the driver to select a mode and to input setup information (e.g., providing a UI).

When the display unit in the cluster or the display device is a touchscreen type in which input is performed by touch gestures, the input unit may be omitted. When the PnG mode is not turned on when the auto cruise mode is turned on, i.e., in the off state of the PnG mode, a generally known constant-speed cruise mode of a hybrid electric vehicle, i.e., general constant-speed driving control in which a vehicle maintains a target vehicle speed set by a driver, may be executed. The PnG constant-speed cruise mode (PnG_const) of the PnG mode differs from the general constant-speed cruise mode only in that the PnG constant-speed cruise mode (PnG_const) is selectable in the on state of the PnG mode, but has no difference from the general constant-speed cruise mode in that constant-speed driving control of a vehicle is executed to maintain the target vehicle speed set by the driver.

As exemplarily shown in FIG. 4, when the PnG constant-speed cruise mode (PnG_const) is selected, constant-speed driving control of the vehicle may be executed to maintain the vehicle speed set by the driver in the on state of the auto cruise mode, i.e., the target vehicle speed. In the PnG constant-speed cruise mode (PnG_const), power of the driving motor 32 may be used (in the EV mode) or hybrid power of the engine 31 and the driving motor 32 is used (in the HEV mode), in the same manner as the general constant-speed cruise mode.

In other words, when the PnG constant-speed cruise mode (PnG_const) is selected, in the in-gear state of the transmission 34, constant-speed driving of the vehicle in the HEV mode or the EV mode determined according to driving may be is executed in the same manner as the general constant-speed cruise mode, and the engine clutch 33 may be operated to be closed in the HEV mode and may be operated to be opened in the EV mode. Further, in the EV mode, power of the engine 31 is not used and thus the engine 31 may enter the fuel cut or engine complete stop state.

In such a PnG constant-speed cruise mode (PnG_const), the OOL driving strategy may be maintained. In other words, an operating point on the OOL may be determined based on the HEV driving strategy and torque distribution to the engine 31 and the driving motor 32 may be executed to achieve torque output providing required torque. Further, when the vehicle is driven in the PnG constant-speed cruise mode (PnG_const), the engine clutch 33 may be operated to be closed in the HEV mode and may be operated to be opened in the EV mode, in the same manner as in the general HEV/EV modes.

In the PnG constant-speed cruise mode, the vehicle may be configured to maintain a constant target vehicle speed during driving and thus drivability may be improved. However, power transmission efficiency may be determined according to power distribution to the engine 31 and the driving motor 32 and power used to execute charging/discharging may cause a decrease in efficiency. Further, the engine 31 and the driving motor 32 may be continuously output power to provide required torque to maintain a constant speed and thus fuel and electrical energy may be continuously used, and consumption rates of fuel and electrical energy may be increased in proportion to a driving distance and thus fuel efficiency decreases.

When the PnG coast mode (PnG_coast) is selected, the driver may set a vehicle speed variation (Δ vehicle speed) through the UI device 10 after turning on the PnG mode, and upper and lower limit target vehicle speeds, in which the set vehicle speed variation (Δ vehicle speed=a in FIG. 4) is reflected based on the target vehicle speed set by the driver, may be determined. Further, in the PnG coast mode (PnG_coast), when the upper and lower limit target vehicle speeds are determined, driving control to track the upper and lower limit target vehicle speeds may be executed. In the driving control, one or more of the engine 31 and the driving motor 32 may be operated to accelerate the vehicle to the upper limit target vehicle speed in the pulse phase.

Particularly, required power and required torque to accelerate the vehicle may be increased and, for this purpose, required torque may be determined to increase the vehicle speed based on an acceleration gradient set by the controller 20, and output of power from one or more of the engine 31 and the driving motor 32 may be adjusted to provide the determined required torque. The acceleration gradient may have a value predetermined by the controller 20, or may be set by the driver through the UI device 10. In the pulse phase (acceleration section), the transmission 34 may be operated in the in-gear state, and the engine clutch 33 may be closed when power of the engine 31 is used to provide the required torque, and may be opened in the fuel cut or engine complete stop state when the power of the engine 31 is not used.

Further, in the coast phase (deceleration section), deceleration control to drive the vehicle by inertia until the vehicle speed reaches the lower limit target vehicle speed in the stopped state of the engine 31 and the driving motor 32 may be executed. As shown in Table 1, when the transmission 34 is in the neutral position, the engine clutch 33 may be opened, and the engine 31 may enter the fuel cut or engine complete stop state. Particularly, the transmission 34 may maintain the in-gear state rather than the neutral position and, in this case, energy recovery by the driving motor 32 may be enabled.

Next, the PnG glide mode (PnG_glide) differs from the PnG coast mode (PnG_coast) in that vehicle deceleration control restrictedly using electrical power, i.e., motor power, may be executed in the glide phase, but the PnG glide mode (PnG_glide) has no difference from the PnG coast mode (PnG_coast) in terms of control of the acceleration section (the pulse phase) and thus a detailed description of the pulse phase will be omitted. In the glide phase of the PnG glide mode (PnG_glide), motor torque may be generated to gradually decelerate the vehicle, as compared to in the coast phase of the PnG coast mode (PnG_coast), and a driving distance in the glide phase of the PnG glide mode (PnG_glide) may be increased to be longer than a driving distance in the coast phase of the PnG coast mode (PnG_coast).

In other words, in the glide phase of the PnG glide mode (PnG_glide), torque assistance control by the driving motor 32 which generates force to move the vehicle may be executed to supplement inertia of the vehicle, and the vehicle may be decelerated along a speed profile having a gradual deceleration gradient by torque assistance control, as compared to the coast phase of the PnG coast mode (PnG_coast) in the vehicle is decelerated by inertia of the vehicle.

When the PnG glide mode (PnG_glide) is selected, the driver may set a vehicle speed variation (Δ vehicle speed) through the UI device 10, after turning on the PnG mode, and set deceleration setup information to determine a speed profile in the glide phase, i.e., the extent of opening of an accelerator position sensor (APS) or a deceleration gradient, through the UI device 10 together with the vehicle speed variation. Particularly, the degree of opening of the acceleration position sensor (APS) does not indicate the engagement degree of an accelerator pedal, but means a torque assistance amount applied in the glide phase of the PnG glide mode (PnGglide), i.e., a torque assistance amount by the driving motor 32, and the degree of opening of the APS may be set by the driver through the UI device 10.

In particular, the opening degree of the APS or the deceleration gradient to regulate the speed profile in the glide phase may be divided into a plurality of levels, and the driver may select a desired level. Accordingly, upper and lower limit target vehicle speeds, in which the set vehicle speed variation (Δ vehicle speed=a in FIG. 4) is reflected based on the target vehicle speed set by the driver, may be determined, the vehicle may be accelerated to the upper limit target vehicle speed in the pulse phase, and then torque assistance by the motor 32 that corresponds to the opening degree of the APS set by the driver may be executed in the glide phase. Torque assistance in the deceleration section, i.e., in the glide phase, other than torque assistance to accelerate the vehicle, indicates use of motor power to decelerate the vehicle using a speed profile having a gradual deceleration gradient, as compared to the coast phase in which vehicle deceleration is performed by inertia of the vehicle.

With reference to Table 1, in the glide phase of the PnG glide mode (PnG_glide), the transmission 34 is in the in-gear state, the engine clutch 33 is opened, and the engine 31 enters the fuel cut or engine complete stop state. Accordingly, in the glide phase of the PnG glide mode (PnG_glide), motor power may be used and, as needed, an engine brake may be operated by closing the engine clutch 33 to adjust the vehicle speed according to the speed profile and, as needed, engine torque may be used in the closed state of the engine clutch 33.

Vehicle speed adjustment in the glide phase of the PnG glide mode (PnG_glide), in which the vehicle is gradually decelerated using electrical power, i.e., motor power, is not limited to use of the motor power but may be performed using the engine brake or engine torque. In this way, in the present disclosure, a driver may select a mode through the UI device 10 according to demand for PnG driving and tendency to execute PnG driving in the desired mode and thus optimal auto cruise control in consideration of both fuel efficiency and drivability may be executed.

Figure 5:
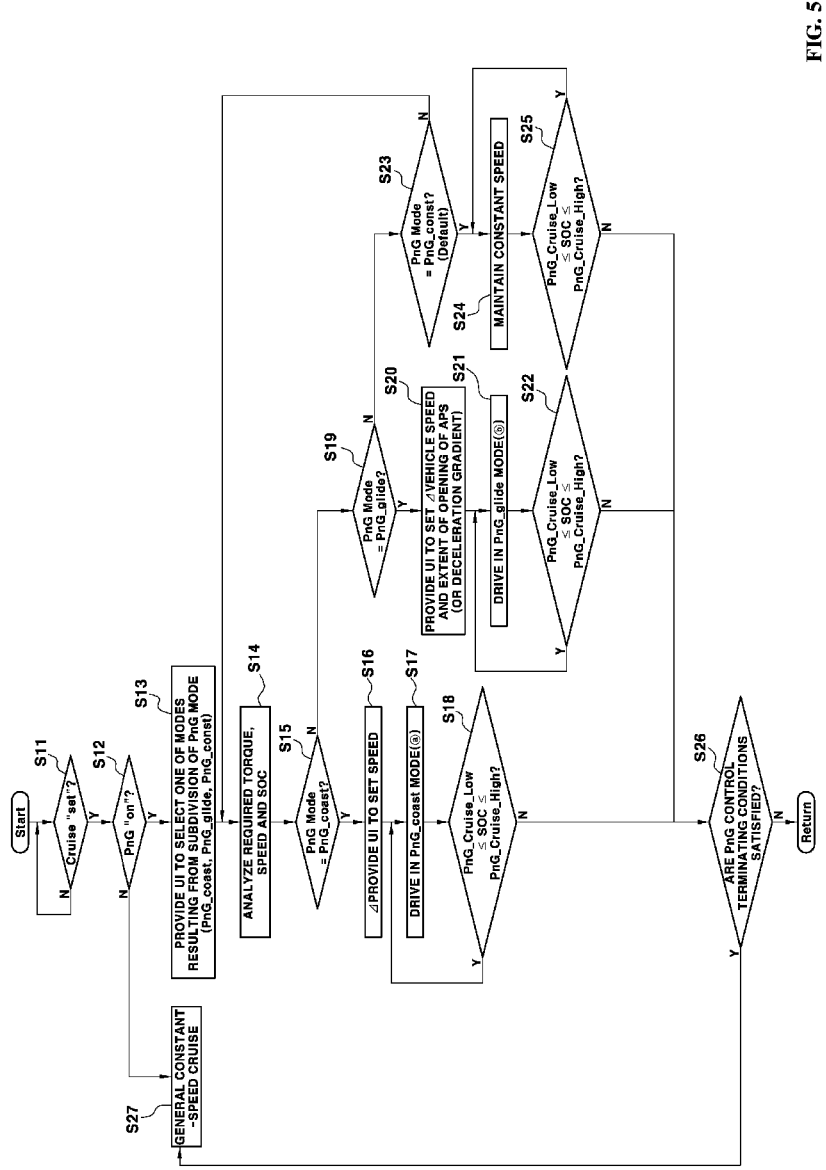
FIGS. 5 to 7 are flowcharts illustrating an auto cruise control process in accordance with an exemplary embodiment of the present disclosure.
Figure 6:
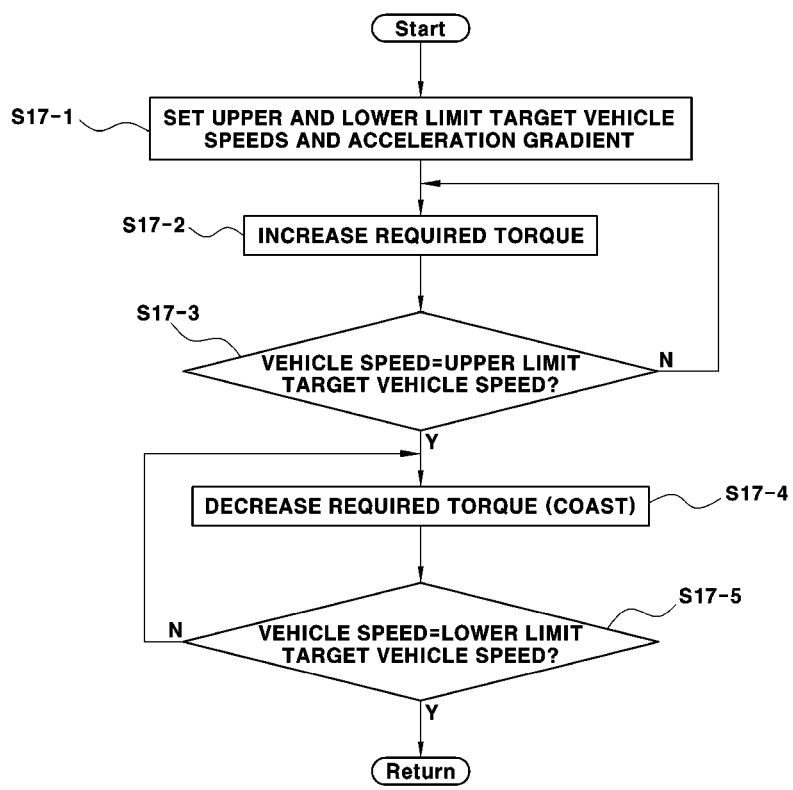
Figure 7:
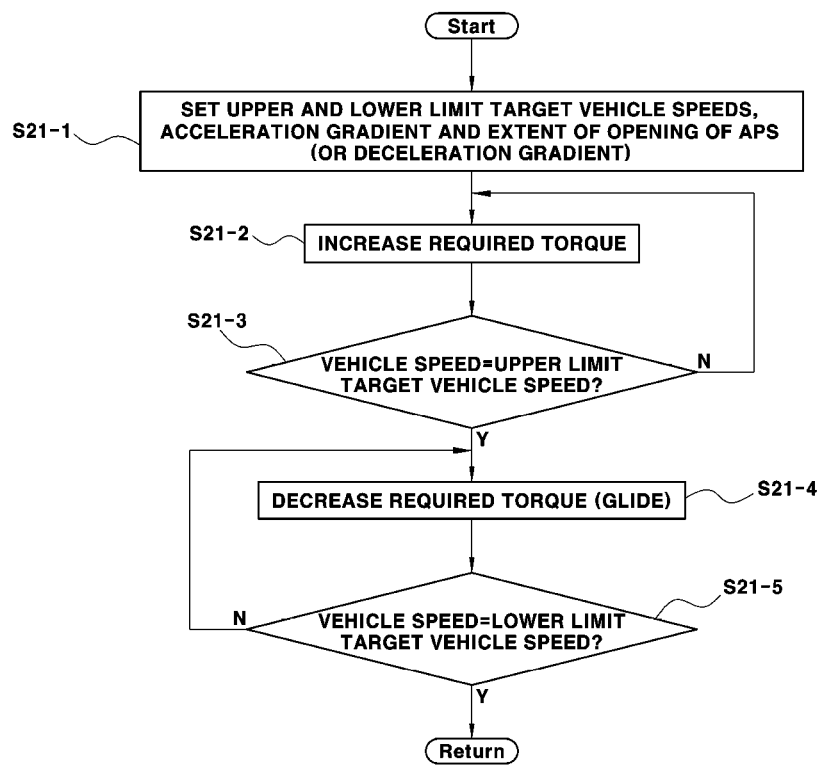

FIGS. 5 to 7 are flowcharts illustrating an auto cruise control process in accordance with the present disclosure. First, with reference to FIG. 5, a driver may turn on the auto cruise mode by setting a target vehicle speed (Operation S11) and then may turn on the PnG mode (Operation S12). When the driver turns on the auto cruise mode but does not turn on the PnG mode, the controller 20 may be configured to maintain a constant speed of the vehicle in the general constant-speed cruise mode (Operation S27).

Further, when the PnG mode is turned on, the controller 20 provides a UI, through which the driver selects a desired mode, through the UI device 10 (Operation S13). Thereafter, when the desired mode is selected by the driver through the UI device 10, the controller 20 may be configured to analyze driver required torque, vehicle speed, and current battery SOC (BMS information) (Operation S14).

Thereafter, when the desired mode selected by the driver is the PnG coast mode (PnG_coast), the controller 20 provides a UI, through which the driver may set information, such as a vehicle speed variation (Δ vehicle speed), etc., through the UI device 10 (Operations S15 and S16). Thereafter, PnG coast mode (PnG_coast) control may be executed by the controller 20 and the vehicle may be driven in the PnG coast mode (PnG_coast) (Operation S17).

Moreover, a process of driving the vehicle in the PnG coast mode (PnG_coast) (ⓐ), i.e., Operation S17 of FIG. 5, will be described with reference to FIG. 6. To drive the vehicle in the PnG coast mode (PnG_coast), as exemplarily shown in FIG. 6, the controller 20 may be configured to determine upper and lower limit target vehicle speeds from the vehicle speed variation (Δ vehicle speed) set by the driver (Operation S17-1), increase required torque until the speed of the vehicle reaches the upper limit target vehicle speed based on a set acceleration gradient, to cause the vehicle driving source to output torque that corresponds to the required torque, and thus vehicle acceleration in the pulse phase may be performed (Operations S17-2 and S17-3).

Further, when the speed of the vehicle reaches the upper limit target vehicle speed, the required torque may be decreased, i.e., output of torque from the vehicle driving source may be stopped, the transmission 34 is in the neutral position, the engine clutch 33 is opened, and the engine 31 enters the fuel cut or engine complete stop state, and, thus, vehicle deceleration driving in which the vehicle is driven by inertia until the speed of the vehicle reaches the lower limit target vehicle speed, i.e., coasting (coast phase), may be performed (Operations S17-4 and S17-5).

In the present disclosure, the increase and decrease in the required torque indicates an increase and decrease in the vehicle speed, and the required torque and the vehicle speed may be increased in the pulse phase of the PnG coast mode (PnG_coast) and may be decreased in the coast phase of the PnG coast mode (PnG_coast). Further, in the coast phase of the PnG coast mode (PnG_coast), vehicle deceleration, in which the vehicle is driven by inertia, may be performed.

Thereafter, when the vehicle speed reaches the lower limit target vehicle speed, the above-described vehicle acceleration and deceleration may be alternately repeated. When the state of charge (SOC) of the battery is within the range between set upper limit (PnG_Cruise_High) and lower limit (PnG_Cruise_Low) (PnG_Cruise_Low≤SOC≤PnG_Cruise_High), driving of the vehicle in the PnG coast mode (PnG_coast) may be maintained (Operation S18).

When set PnG control terminating conditions are satisfied during driving of the vehicle in the PnG coast mode (PnG_coast), the controller 20 may be configured to terminate control in the PnG mode (Operation S26) and switch from the PnG mode to the general constant-speed cruise mode (Operation S27). In particular, as the PnG control terminating conditions, the controller 20 may be configured to terminate (e.g., switch away from) the PnG mode when PnG mode cancellation is input by the driver (Off of the PnG mode) or when the SOC of the battery deviates from the range between the upper limit (PnG_Cruise_High) and the lower limit (PnG_Cruise_Low), and the auto cruise mode may be completely released when predetermined general auto cruise release conditions are satisfied.

Particularly, margin values α and β, respectively applied to the upper limit (PnG_Cruise_High) and the lower limit (PnG_Cruise_Low) of the PnG control terminating conditions, may be set and, when the SOC of the battery deviates from a range in which the margin values are reflected (i.e., if SOC<PnG_Cruise_Low-α or if PnG_Cruise_High+β<SOC) control may be terminated. When the desired mode selected by the driver is the PnG glide mode (PnG_glide), the controller 20 may be configured to provide (e.g., output) a UI, through which the driver may set information, such as a vehicle speed variation (Δ vehicle speed), an opening degree of the APS, etc., through the UI device (Operations S19 and S20). Thereafter, PnG glide mode (PnG_glide) control may be executed by the controller 20 and the vehicle may thus be driven in the PnG glide mode (PnG_glide) (Operation S21).

A process of driving the vehicle in the PnG glide mode (PnG_glide) (ⓑ), i.e., Operation S21 of FIG. 5, will be described with reference to FIG. 7. To drive the vehicle in the PnG glide mode (PnG_glide), as exemplarily shown in FIG. 7, the controller 20 may be configured to determine upper and lower limit target vehicle speeds from the vehicle speed variation (Δ vehicle speed) set by the driver (Operation S21-1), increase required torque until the speed of the vehicle reaches the upper limit target vehicle speed based on the set acceleration gradient, to cause the vehicle driving source to output torque that corresponds to the required torque, and thus vehicle acceleration in the pulse phase may be performed (Operations S21-2 and S21-3).

Further, when the speed of the vehicle reaches the upper limit target vehicle speed, the required torque may be decreased, i.e., the engine clutch 33 is opened, the engine 31 is operated to enter the fuel cut or engine complete stop state and motor torque is adjusted, and, thus, the glide phase in which the vehicle decelerates according to a speed profile having a gradual deceleration gradient by motor power until the speed of the vehicle reaches the lower limit target vehicle speed may be performed (Operations S21-4 and S21-5). In the present disclosure, the increase and decrease in the required torque indicates an increase and decrease in the vehicle speed, and the required torque and the vehicle speed may be increased in the pulse phase (acceleration section) of the PnG glide mode (PnG_glide) and may be decreased in the glide phase (deceleration section) of the PnG glide mode (PnG_glide).

In gliding, torque assistance may be performed by the motor 32 according to deceleration setup information predetermined by the driver through the UI device 10 during deceleration of the vehicle, i.e., an extent of opening of the APS or a deceleration gradient. Thereafter, when the vehicle speed reaches the lower limit target vehicle speed, the above-described vehicle acceleration and deceleration may be alternately repeated. When the SOC of the battery is within the range between the set upper limit (PnG_Cruise_High) and lower limit (PnG_Cruise_Low) (PnG_Cruise_Low≤SOC≤PnG_Cruise_High), driving of the vehicle in the PnG glide mode (PnG_glide) may be maintained (Operation S22).

When the set PnG control terminating conditions are satisfied during driving of the vehicle in the PnG glide mode (PnG_glide), the controller 20 may be configured to terminate the PnG mode (Operation S26) and switch from the PnG mode to the general constant-speed cruise mode (Operation S27). Particularly, as the PnG control terminating conditions, the controller 20 may be configured to terminate (e.g., switch from) the PnG mode when PnG mode cancellation is input by the driver (Off of the PnG mode) or when the SOC of the battery deviates from the range between the upper limit (PnG_Cruise_High) and the lower limit (PnG_Cruise_Low), and the auto cruise mode may be completely released when the predetermined general auto cruise release conditions are satisfied.

Further, margin values α and β, respectively applied to the upper limit (PnG_Cruise_High) and the lower limit (PnG_Cruise_Low) of the PnG control terminating conditions, may be set and, when the SOC of the battery deviates from the range in which the margin values are reflected (i.e., if SOC<PnG_Cruise_Low-α or if PnG_Cruise_High+β<SOC) control may be terminated. Thereafter, when the desired mode selected by the driver is the PnG constant-speed cruise mode (PnG_const), constant-speed maintenance control, in which the speed of the vehicle maintains a target speed under the condition that the SOC of the battery is within the range between the set upper limit (PnG_Cruise_High) and lower limit (PnG_Cruise_Low), may be performed (Operations S23, S24 and S25).

Thereafter, when the set PnG control terminating conditions are satisfied during constant-speed maintenance control, the controller 20 may be configured to terminate the PnG mode (Operation S26) and switch from the PnG mode to the general constant-speed cruise mode (Operation S27). The PnG control terminating conditions are described above, and the auto cruise mode may be completely released when the predetermined general auto cruise release conditions are satisfied.

Figure 8:
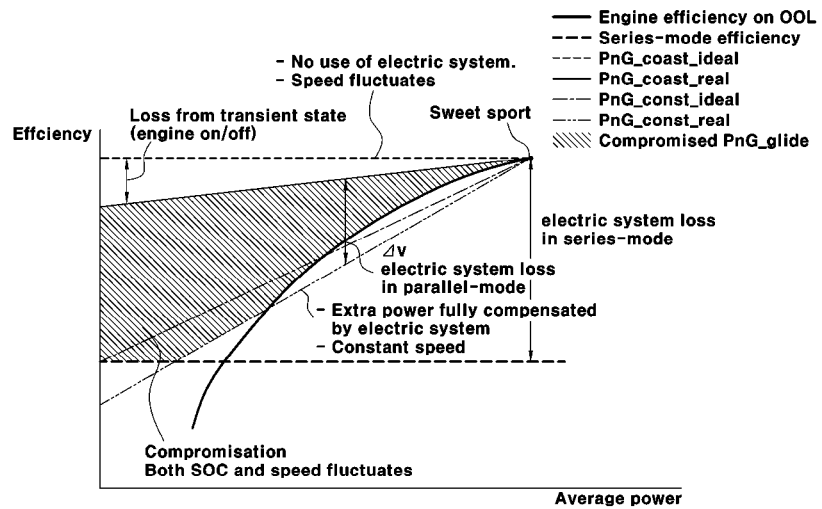
FIGS. 8 to 10 are graphs illustrating a comparison of the modes resulting from subdivision of the PnG mode in accordance with an exemplary embodiment of the present disclosure.

FIG. 8 is a graph illustrating a comparison of the respective modes resulting from subdivision of the PnG mode, the X-axis indicates power and the Y-axis indicates efficiency. In the hybrid electric vehicle, a point having the maximum engine efficiency is referred to as a sweet spot SS and such a sweet spot SS represents the optimal operating point on the BSFC map. In the first PnG coast mode (PnG_coast_ideal) which is an ideal driving mode, an engine operating point may be located at the sweet spot SS in the pulse phase and the engine may be stopped in the coast phase, and thus the vehicle may be theoretically driven with maximum efficiency.

Particularly, since the vehicle dynamic characteristics and the transient state are not considered, a variation width of the vehicle speed may be rapidly increased in the direction toward a lower power region and drivability of the vehicle is adversely affected. In the second PnG coast mode (PnG_coast_ideal) which is a real driving mode, there is a sweet spot tracking limit due to a fixed gear ratio, and the vehicle dynamic characteristics and the transient state are considered and thus efficiency is decreased.

In the PnG constant-speed cruise mode (PnG_const), an operating point is located on the OOL according to the HEV driving strategy, power transmission efficiency is determined according to power distribution to the engine 31 and the driving motor 32, and power used to execute charging/discharging causes a decrease in efficiency. The PnG glide mode (PnG_glide) is a mode in which a compromise is made between the driving strategies of the PnG coast mode (PnG_coast) and the PnG constant-speed cruise mode (PnG_const), and the pulse phase of the PnG glide mode (PnG_glide) is equal to the pulse phase of the PnG coast mode (PnG_coast).

However, in the glide phase of the PnG glide mode (PnG_glide), electrical power may be used, and a driving distance may be increased by generating assistance torque (e.g., assistance torque corresponding to the required torque) to maintain the maximum inertial force of the vehicle. Accordingly, some of electrical power energy fully stored by coasting in the PnG coast mode (PnG_coast) may be used directly used gliding and may thus compensate for drawbacks caused by decreasing circulation efficiency of electrical power.

Therefore, in the PnG glide mode (PnG_glide), a vehicle speed is not maintained as high as in the PnG constant-speed cruise mode (PnG_const), but vehicle deceleration is not executed as much as in the PnG coast mode (PnG_coast). Consequently, through such a compromise strategy, both high efficiency, corresponding to the advantage of the PnG coast mode (PnG_coast), and high drivability, corresponding to the advantage of the PnG constant-speed cruise mode (PnG_const), may be partially acquired.

Figure 9:
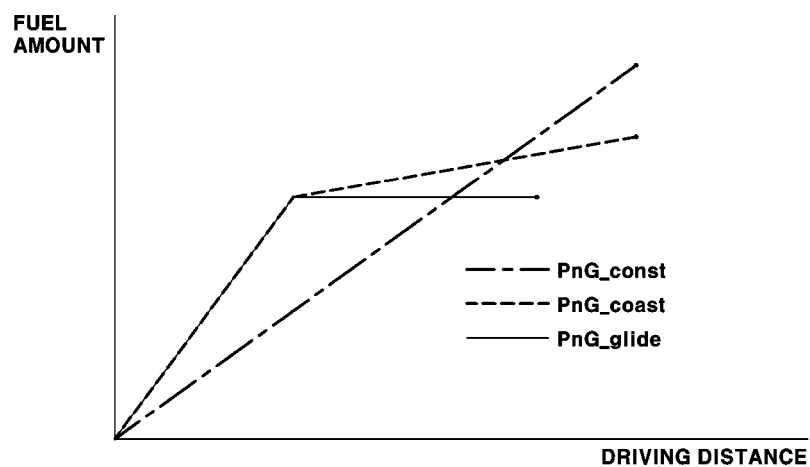

FIG. 9 is a graph illustrating a comparison of the respective modes resulting from subdivision of the PnG mode, the X-axis indicates the driving distance and the Y-axis indicates the cumulative fuel consumption amount. In the PnG constant-speed cruise mode (PnG_const), the vehicle is in a constant driving state and thus a fuel consumption amount may be increased in proportion to a driving distance.

In the PnG coast mode (PnG_coast), a fuel consumption amount in the pulse phase may be greater than the fuel consumption amount in the PnG constant-speed cruise mode (PnG_const), but no fuel is consumed in the coast phase due to coasting (fuel cut-in) and thus the total cumulative fuel consumption amount is decreased, compared to the PnG constant-speed cruise mode (PnG_const). Further, the operating point in the pulse phase is near the sweet spot and, thus, the vehicle may be driven in a section having high engine efficiency and improvement in fuel efficiency may be acquired.

In the PnG glide mode (PnG_glide), the pulse phase is equal to the pulse phase of the PnG coast mode (PnG_coast), but in the glide phase, some of energy regenerated by coating may be used directly to drive the vehicle and thus an actual driving distance may be extended. Accordingly, the decrease in energy efficiency may be minimized due to electric system circulation of regenerative energy and, thus, in the glide phase, energy corresponding to minimum driving required torque may be additionally consumed but the total energy consumption amount is reduced, compared to the PnG constant-speed cruise mode (PnG_const).

Figure 10:
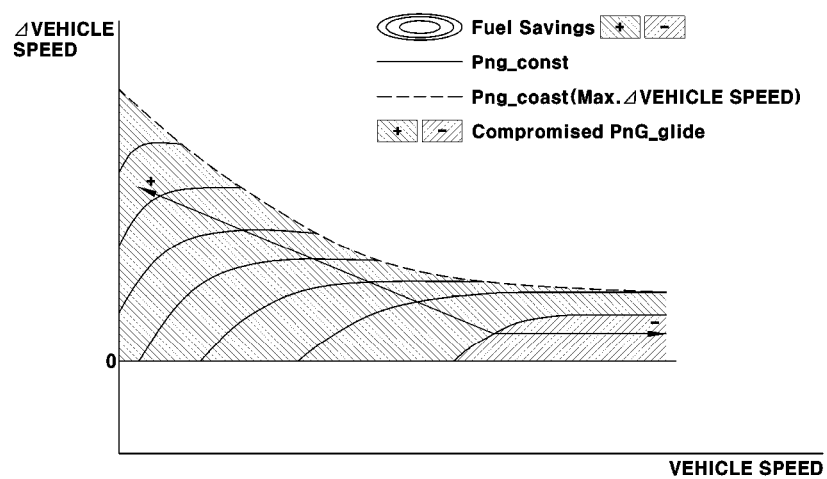

FIG. 10 is a graph illustrating a comparison of the respective modes resulting from subdivision of the PnG mode, the X-axis indicates the vehicle speed and the Y-axis indicates the vehicle speed variation. As the vehicle speed decreases, improvement in fuel efficiency of the PnG coast mode (PnG_coast) increases but the vehicle speed variation increases and thus drivability is poor. In other words, there is trade off relations between improvement in fuel efficiency and drivability. Further, as the vehicle speed increases, improvement in fuel efficiency due to PnG driving is decreased. Therefore, in the present disclosure, a UI, through which a driver may directly select and set a desired mode out of a plurality of modes resulting from subdivision of the PnG mode in consideration of trade off relations, is provided and a UI, through which the driver may set a vehicle speed variation range, etc., when each mode is selected, is provided.

As is apparent from the above description, an auto cruise control method in accordance with the present disclosure employs a PnG driving pattern in consideration of characteristics of hybrid electric vehicles and may thus maximize improvement in fuel efficiency. Further, in the auto cruise control method in accordance with the present disclosure, the PnG mode may be divided into a PnG constant-speed cruise mode, a PnG coast mode and a PnG glide mode and thus, a driver may select one thereof, the vehicle may be driven in the mode desired by the driver, and driving of the vehicle in the PnG glide mode is enabled to satisfy both drivability and improvement in fuel efficiency.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. An auto cruise control method for a hybrid electric vehicle, comprising:
   turning on, by a controller, an auto cruise control mode in response to receiving a user input of a target vehicle speed in the hybrid electric vehicle using an engine and a driving motor as vehicle driving sources, and turning on a pulse and glide (PnG) mode;
   providing, by the controller, a user interface (UI) device to allow user selection of any one of a PnG coast mode, a PnG glide mode and a PnG constant-speed cruise mode; and
   operating, by the controller, the hybrid vehicle in a selected mode based on the user selection through the UI device,
   wherein in the PnG coast mode, a pulse phase that corresponds to a vehicle acceleration section and a coast phase that corresponds to a second deceleration section are alternately repeated between set upper and lower limit target vehicle speeds, and coasting of the hybrid electric vehicle by inertia of the hybrid electric vehicle is performed in the coast phase,
   wherein in the PnG glide mode, the pulse phase that corresponds to the vehicle acceleration section and a glide phase that corresponds to a vehicle deceleration section are alternately repeated between the set upper and lower limit target vehicle speeds, and deceleration driving of the hybrid electric vehicle based on a speed profile, set by inertia of the hybrid electric vehicle and torque assistance of the driving motor, is performed in the glide phase,
   wherein in the PnG constant-speed cruise mode, the controller is configured to maintain the target vehicle speed using the vehicle driving sources,
   wherein when the PnG glide mode is selected and deceleration setup information is input through the UI device, the speed profile is set according to the deceleration setup information, and
   wherein the deceleration setup information is an amount of torque assistance by the driving motor.

2. The auto cruise control method of claim 1, wherein when the PnG coast mode is selected, the set upper and lower limit target vehicle speeds are determined based on a vehicle speed variation input to the UI.

3. The auto cruise control method of claim 1, wherein when the PnG coast mode or the PnG glide mode is selected and an acceleration gradient in the pulse phase is set through the UI device, the vehicle speed is increased until the vehicle speed reaches the set upper limit target vehicle speed using the vehicle driving sources in the pulse phase of the selected mode according to the acceleration gradient.

4. The auto cruise control method of claim 1, wherein an amount of torque assistance of the driving motor or a deceleration gradient is divided into a plurality of levels and a desired level is user selected to input the deceleration setup information.

5. The auto cruise control method of claim 1, wherein power generation of the driving motor is adjusted to perform deceleration in the glide phase of the PnG glide mode at a gradual deceleration gradient, compared to deceleration in the coast phase of the PnG coast mode.

6. The auto cruise control method of claim 1, wherein, when the PnG mode is turned off under the condition that the auto cruise control mode is turned on, a constant-speed driving mode to maintain the target vehicle speed using the vehicle driving sources is executed.

7. The auto cruise control method of claim 1, wherein, when the state of charge (SOC) of a battery is within a predetermined range while the hybrid electric vehicle is driven in one selected from the PnG coast mode, the PnG glide mode and the PnG constant-speed cruise mode, driving of the hybrid electric vehicle in the corresponding mode is maintained.

8. The auto cruise control method of claim 7, wherein, when the SOC of the battery deviates from the predetermined range while the hybrid electric vehicle is driven in one selected from the PnG coast mode, the PnG glide mode and the PnG constant-speed cruise mode, a constant-speed driving mode to maintain the target vehicle speed using the vehicle driving sources is executed.

9. The auto cruise control method of claim 1, wherein, in the coast phase of the PnG coast mode, an engine clutch disposed between the engine and the driving motor is opened, a transmission is in a neutral position, and a fuel cut or engine complete stop state of the engine is maintained.

10. The auto cruise control method of claim 1, wherein, in the coast phase of the PnG coast mode, an engine clutch disposed between the engine and the driving motor is opened, a fuel cut or engine complete stop state of the engine is maintained, and energy recovery by the driving motor is performed in an in-gear state of a transmission.

11. The auto cruise control method of claim 1, wherein, in the glide phase of the PnG glide mode, an engine clutch disposed between the engine and the driving motor is opened, an in-gear state of a transmission is maintained, and a fuel cut or engine complete stop state of the engine is maintained.

12. An auto cruise control system for a hybrid electric vehicle, comprising:

a memory configured to store program instructions; and
a processor configured to execute the program instructions, the program instructions when executed configured to:
  turn on an auto cruise control mode in response to receiving a user input of a target vehicle speed in the hybrid electric vehicle using an engine and a driving motor as vehicle driving sources, and turning on a pulse and glide (PnG) mode;
  provide a user interface (UI) device to allow user selection of any one of a PnG coast mode, a PnG glide mode and a PnG constant-speed cruise mode; and
  operate the hybrid vehicle in a selected mode based on the user selection through the UI device,
  wherein in the PnG coast mode, a pulse phase that corresponds to a vehicle acceleration section and a coast phase that corresponds to a second deceleration section are alternately repeated between set upper and lower limit target vehicle speeds, and coasting of the hybrid electric vehicle by inertia of the hybrid electric vehicle is performed in the coast phase,
  wherein in the PnG glide mode, the pulse phase that corresponds to the vehicle acceleration section and a glide phase that corresponds to a vehicle deceleration section are alternately repeated between the set upper and lower limit target vehicle speeds, and deceleration driving of the hybrid electric vehicle based on a speed profile, set by inertia of the hybrid electric vehicle and torque assistance of the driving motor, is performed in the glide phase,
  wherein in the PnG constant-speed cruise mode, the target vehicle speed is maintained using the vehicle driving sources,
  wherein when the PnG glide mode is selected and deceleration setup information is input through the UI device, the speed profile is set according to the deceleration setup information, and
  wherein the deceleration setup information is an amount of torque assistance by the driving motor.

* * * * *